United States Patent
Keigley

(10) Patent No.: US 11,483,955 B1
(45) Date of Patent: Nov. 1, 2022

(54) SURFACE CONDITIONING DRAG TOOLS

(71) Applicant: ABI Attachments, Inc., Mishawaka, IN (US)

(72) Inventor: Kevin V. Keigley, Osceola, IN (US)

(73) Assignee: ABI Attachments, Inc., Mishawak, IN (US)

( * ) Notice: Subject to any disclaimer, the term of this patent is extended or adjusted under 35 U.S.C. 154(b) by 893 days.

(21) Appl. No.: 16/194,603

(22) Filed: Nov. 19, 2018

(51) Int. Cl.
*A01B 31/00* (2006.01)
*E01C 23/082* (2006.01)

(52) U.S. Cl.
CPC .......... *A01B 31/00* (2013.01); *E01C 23/082* (2013.01)

(58) Field of Classification Search
CPC .............................. A01B 31/00; E01C 23/082
See application file for complete search history.

(56) References Cited

U.S. PATENT DOCUMENTS

| | | | | |
|---|---|---|---|---|
| 440,854 A * | 11/1890 | Travis | .................... | A01B 31/00 172/612 |
| 768,358 A * | 8/1904 | Davis | .................... | A01B 31/00 172/612 |
| 836,980 A * | 11/1906 | Little | .................... | A01B 31/00 172/612 |
| 898,695 A * | 9/1908 | Sosa | .................... | A01B 31/00 172/612 |
| 1,146,155 A * | 7/1915 | Gullickson | .......... | E01C 23/082 172/199 |
| 1,150,936 A * | 8/1915 | Furnas | .................... | A01B 31/00 172/612 |
| 1,158,803 A * | 11/1915 | Gullickson | ............ | A01B 31/00 172/612 |
| 1,198,533 A * | 9/1916 | Glerum | .................... | A01B 31/00 172/612 |
| 1,384,220 A * | 7/1921 | Sykes | .................... | A01B 1/06 172/379 |
| 1,428,880 A * | 9/1922 | Mott | .................... | A01B 31/00 172/684.5 |
| 1,530,329 A * | 3/1925 | Roberts | .................. | A01B 31/00 172/612 |
| 1,569,421 A * | 1/1926 | Coelho | .................... | A01B 1/24 172/379 |
| 4,827,706 A * | 5/1989 | Meyer et al. | ............ | A01D 7/00 56/400.05 |
| 4,836,295 A | 6/1989 | Estes | | |
| 5,699,863 A | 12/1997 | Figura | | |

(Continued)

OTHER PUBLICATIONS

Drag Mats & Field Drags for Baseball & Softball Infields—On Deck Sports—Online Catalog, 6 pgs., retrieved Nov. 19, 2018.

(Continued)

*Primary Examiner* — Thomas B Will
*Assistant Examiner* — Joel F. Mitchell
(74) *Attorney, Agent, or Firm* — Taft Stettinius & Hollister LLP

(57) ABSTRACT

A surface conditioning drag tool apparatus includes a plurality of fencing members each extending laterally along a width of the drag tool and spaced apart from one another at a plurality of locations between a front end and a rear end of the drag tool. The plurality of fencing members include a plurality of lower ground contacting extremities and a plurality of upper extremities spaced apart from one another in height and a frame coupled with and positioned above the plurality of ground working fencing members.

7 Claims, 10 Drawing Sheets

(56) References Cited

U.S. PATENT DOCUMENTS

| | | |
|---|---|---|
| 5,833,012 A | 11/1998 | Pierce |
| 5,988,295 A | 11/1999 | Goulet |
| 6,119,792 A | 9/2000 | Almer |
| 6,962,012 B1 | 11/2005 | Grimmett |
| 2014/0096984 A1 | 4/2014 | Thurnstrom |

OTHER PUBLICATIONS

Baseball Field Drafts—True Pitch, Inc. Online Catalog, 5 pgs., retrieved Nov. 19, 2018.

* cited by examiner

SURFACE CONDITIONING DRAG TOOLS

BACKGROUND

The present disclosure relates generally to surface conditioning drag tools and apparatuses, methods, systems and techniques pertaining to the same. More particularly, but not exclusively, the present disclosure relates to surface conditioning drag tools providing a high degree of accuracy, efficacy and precision in loosening and maintaining an upper layer of material of a ground surface which is provided over a relatively compact underlying subsurface layer.

For certain ground surfaces, including but not limited to baseball infields and warning tracks or other athletic field or arena surfaces, it is desirable to provide a relatively compacted subsurface, such as a clay composition, under an upper layer of relatively loose surface material referred to as a top dressing or conditioner. In some cases, top dressings compositions may be carefully selected and processed to provide desirable playing characteristics and therefore tend to be costly. For example, top dressings may comprise calcined clays (e.g., montmorillinite and illite clays fired to 1200° to 1400° F.), vitrified clays, lightweight aggregates (e.g., expanded shale and crushed brick fired to high temperatures of up to 2000° F.), crushed aggregates (e.g., crushed non-fired stone such as decomposing red granite, shale and others), and diatomaceous earth, as well as mixtures of these and other materials. In other cases, top dressings compositions may be less rigorously selected and processed. For example, the top dressing may be provided by augmenting native surface material. Such augmentation may involve adding sand to clay-rich native soil or adding clay to sand-rich native soil. In other examples, top dressing material may be provided by working native surface material without augmentation, such as by grooming a native soil deemed to have an acceptably sandy composition for play.

A number of surface conditioning tools have been proposed for maintaining playing surfaces such as a baseball diamond infield and warning track surfaces. Heretofore, such tools have suffered from a number of drawbacks and disadvantages. For example, conventional tools lack satisfactory control over the deposition of material on playing surfaces and tend to leave undesired surface markings in their wake. Furthermore, conventional tools provide limited ability to control depth or thickness of top dressing layers which further compounds the need for numerous tool passes over a playing surface. Conventional tools often require numerous passes over a playing surface. Even after many passes, the playing surfaces require additional labor with handheld broom or rake tools to provide desired playing surface characteristics.

Conventional tools have also failed to realize a number of desirable grooming and maintenance results. For example, it would be desirable to preserve and promote separation of the top dressing material from the compacted subsurface. It would also be desirable to avoid and reverse compaction of the top dressing material into the subsurface. It would further be desirable to provide the top dressing layer with a uniform depth, e.g., ⅛ inch to ⅜ inch, preferably for some applications ¼ inch, over some or all of the ground surface. It would also be desirable to be able to provide and maintain precise grading of the ground surface to promote drainage to desired locations and to avoid undesired pooling. It would further desirable to avoid or minimize the markings or upper surface variations imparted by work tools used in maintaining playing surface. As is evident from the shortcomings and unmet needs in the art, there remains a substantial need for the unique apparatuses, systems and methods disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a unique surface conditioning drag tool. Another embodiment is a unique system including a surface conditioning drag tool. A further embodiment is a unique method of operating a surface conditioning drag tool. Other embodiments, forms, objects, features, advantages, aspects, and benefits shall become apparent from the following description and drawings.

DETAILED DESCRIPTION OF ILLUSTRATIVE EMBODIMENTS

Figure 1:
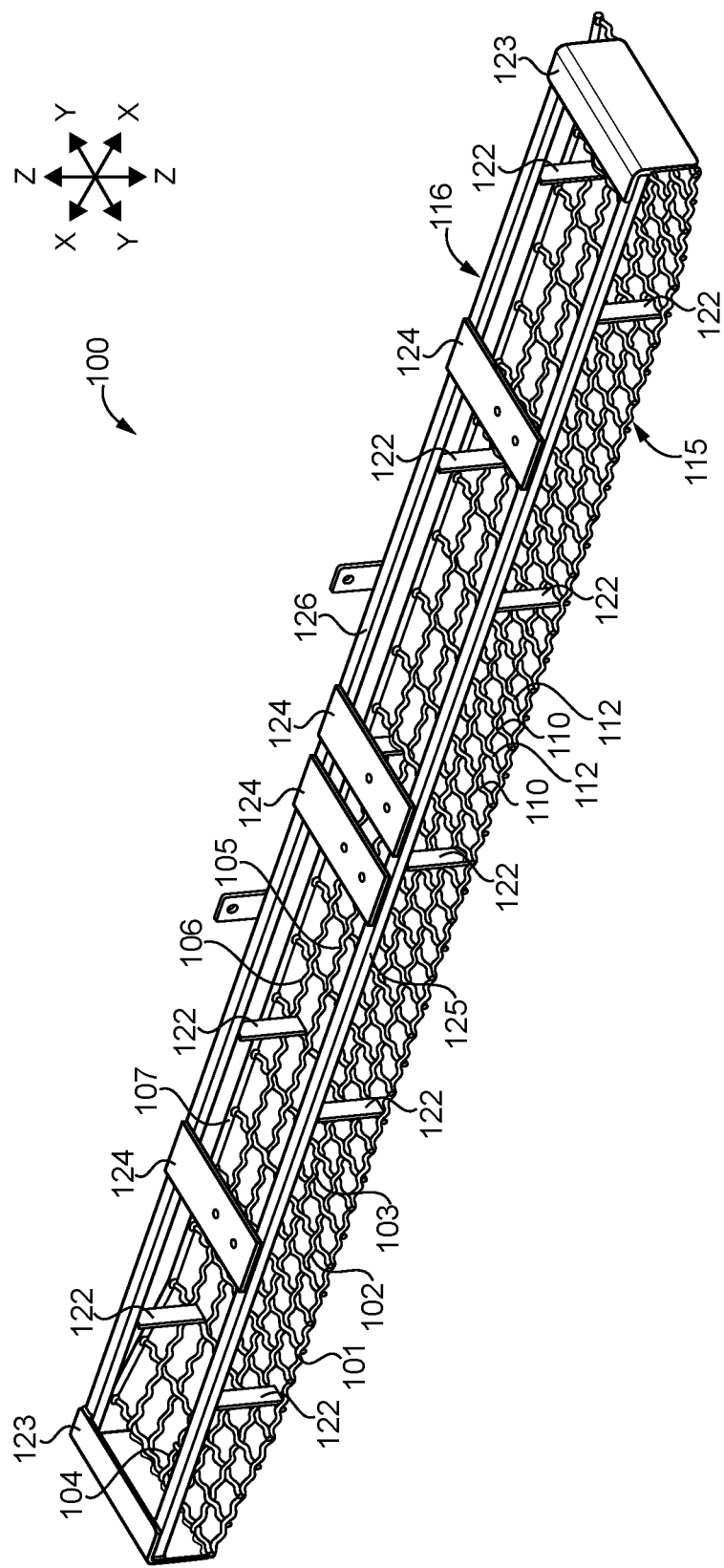
FIG. 1 is a perspective view of an exemplary surface conditioning drag tool.
Figure 2:
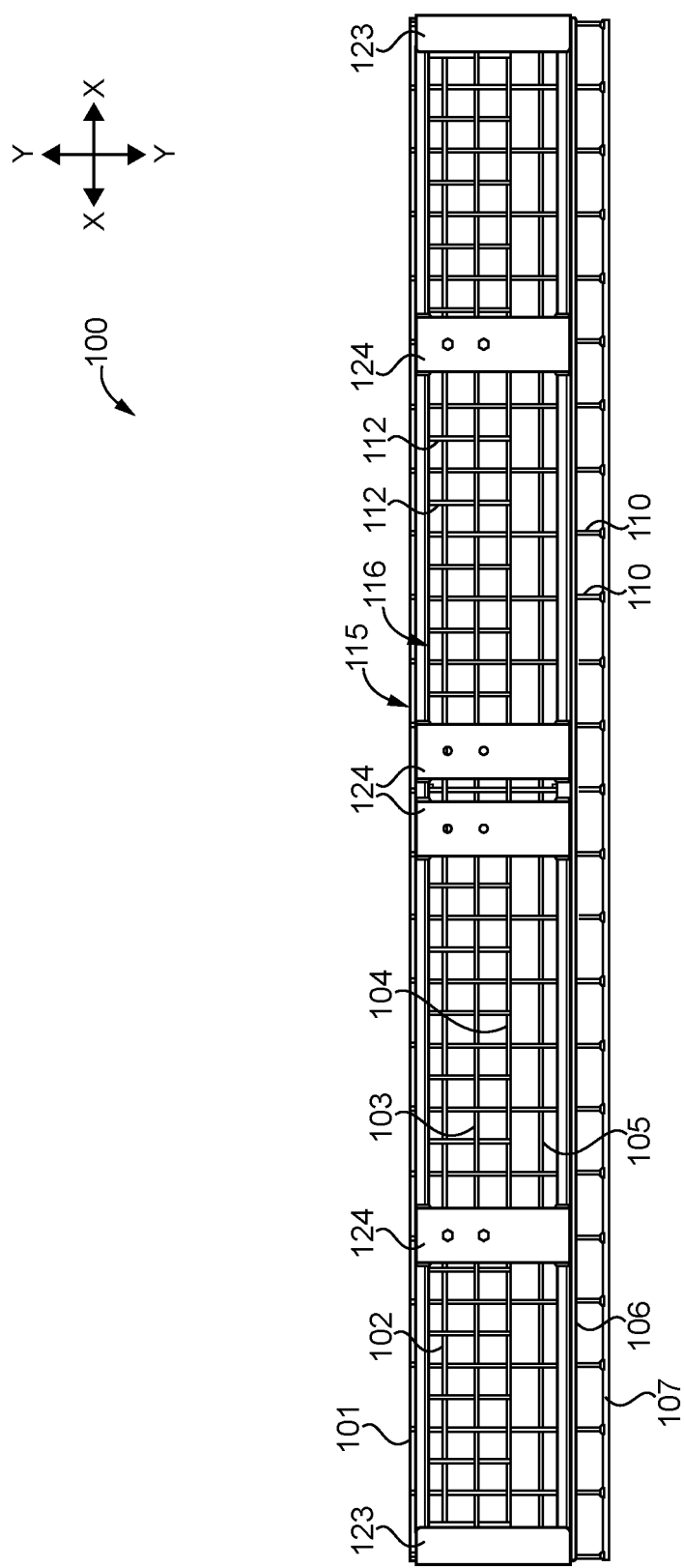
FIG. 2 is a top view of the exemplary surface conditioning drag tool of FIG. 1.
Figure 2A:
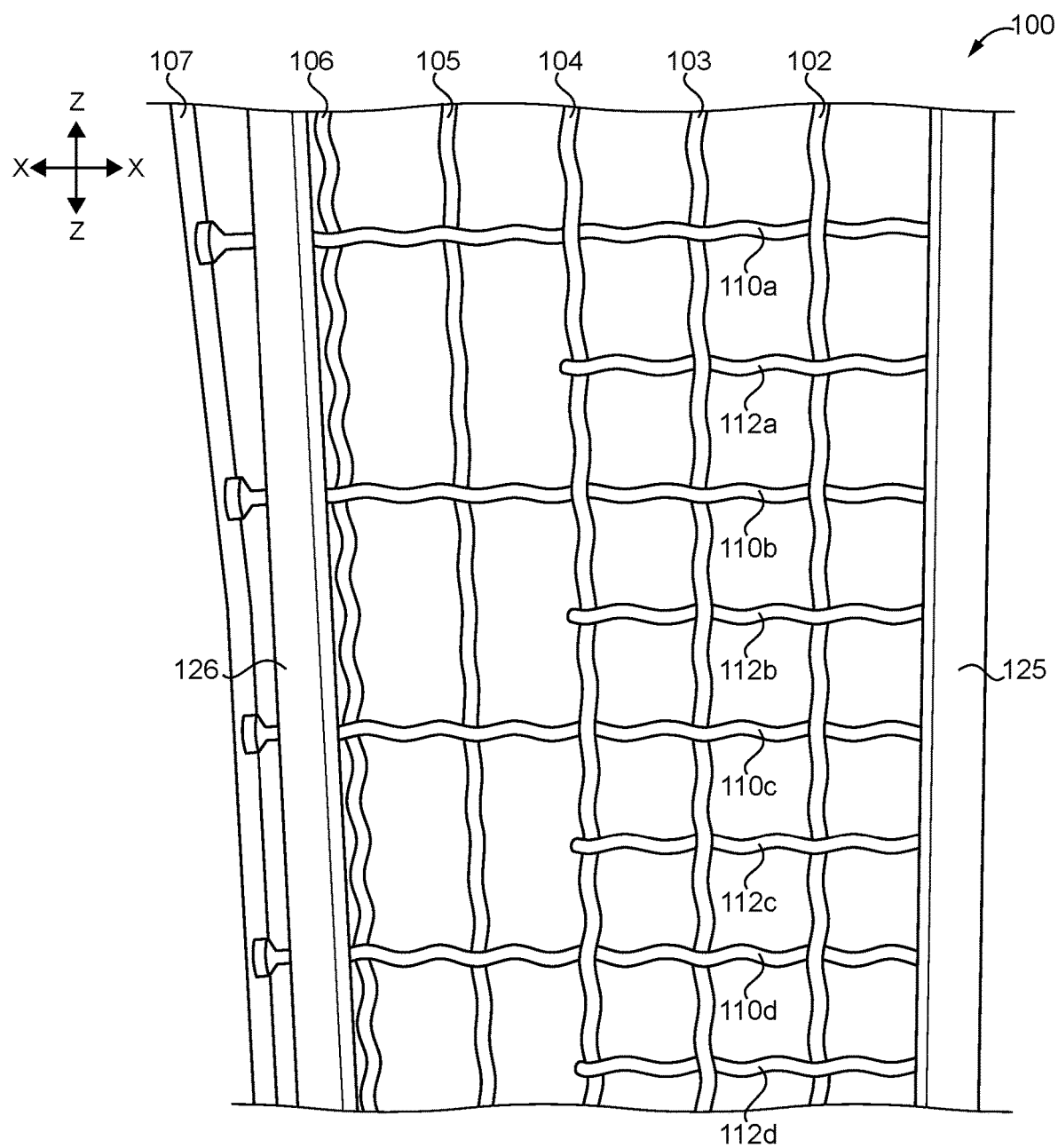
FIG. 2A is an enlarged view of a portion of FIG. 2.
Figure 3:
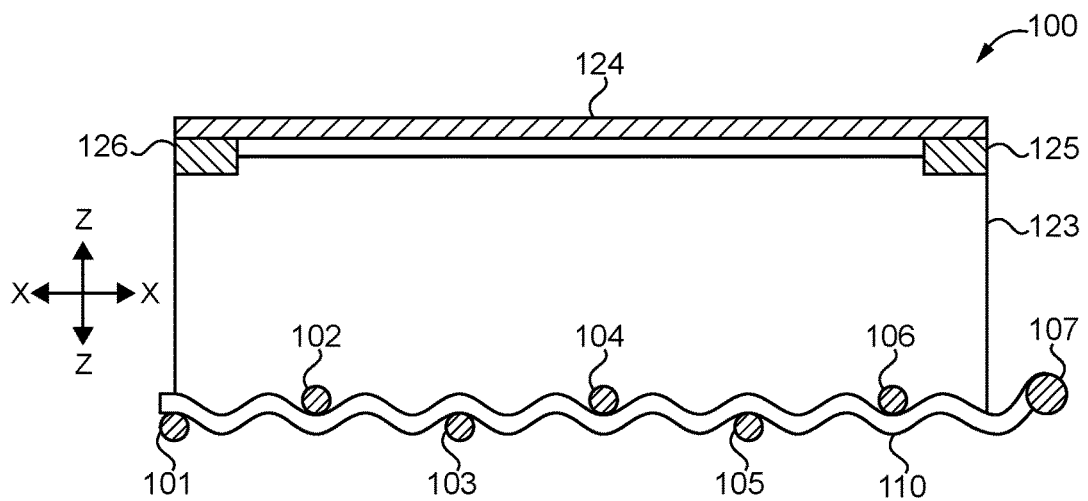
FIG. 3 is a partial sectional side view of the exemplary surface conditioning drag tool of FIG. 1.
Figure 4:
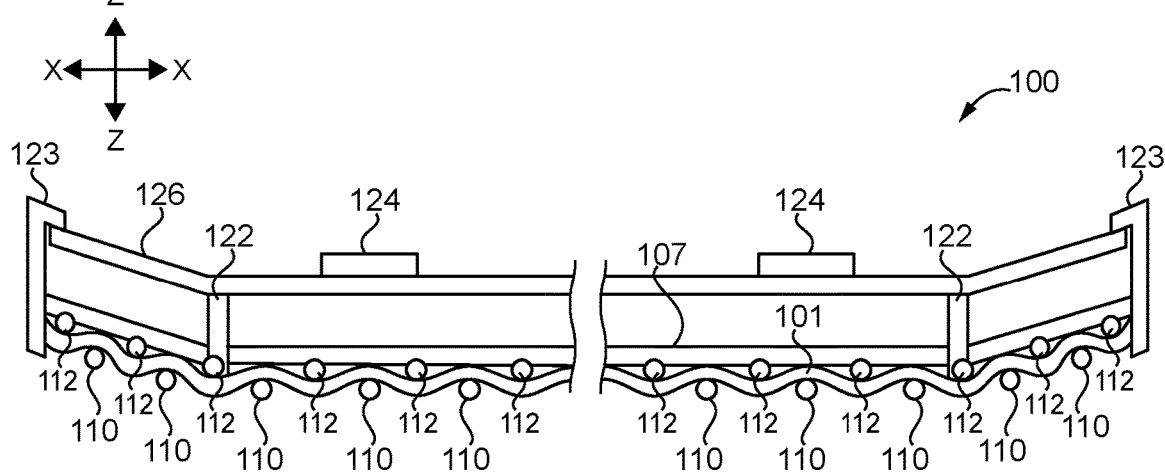
FIG. 4 is a front view of the exemplary surface conditioning drag tool of FIG. 1.
Figure 5:
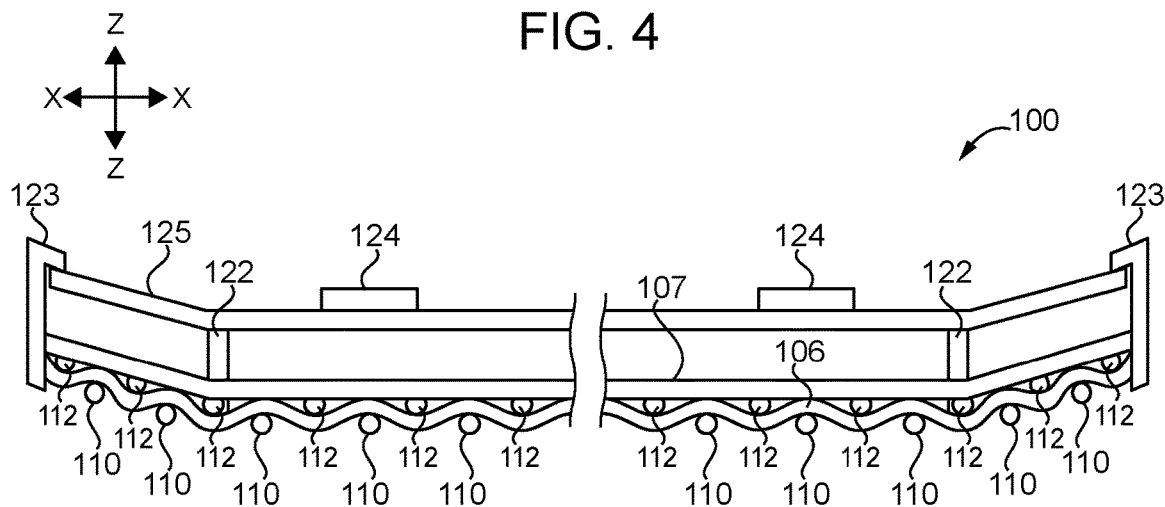
FIG. 5 is a rear view of the exemplary surface conditioning drag tool of FIG. 1.

With reference to FIGS. 1-5 there are illustrated a perspective top view, a front view, a rear view and a side view, respectively, of an exemplary surface conditioning drag tool 100. Surface conditioning drag tool 100 is configured as a tow-behind grading tool and is configured to be coupled with a work machine such as a zero turn radius work machine, a riding lawnmower, a lawn tractor or other types of work machines. In one preferred embodiment, surface conditioning drag tool 100 is configured to be coupled with a work machine by a pitch-adjustable articulating hitch such as is disclosed in commonly assigned, co-pending U.S. application Ser. No. 16/131,449, filed Sep. 14, 2018, and entitled ARTICULATING PITCH-ADJUSTABLE HITCHES FOR SURFACE CONDITIONING TOOLS the disclosure of which is incorporated herein by reference.

Surface conditioning drag tool 100 (sometimes referred to herein as drag tool 100) includes a surface conditioning fence 115 which is configured to contact and work an underlying ground surface such as a baseball infield or other playing field surface during the operation of surface conditioning drag tool 100. Drag tool 100 further includes a frame 116 which is coupled with and positioned in a spaced-apart relationship above the surface conditioning fence 115. In the embodiment illustrated in FIGS. 1-5, the frame 116 includes a front frame member 126, a rear frame member 125, tow coupling members 124, side frame members 123 and support struts 122.

As illustrated in FIG. 1, tool joint member 202 is coupled with and extends forward from one of tow coupling members 124. Tool joint member 292 further includes a joint member at its forward end (not depicted) which is structured to couple with a corresponding joint member of a hitch. Tool joint member 204 is coupled with and extends forward from the other of tow coupling members 124. Tool joint member 204 also includes a joint member at its forward end (not depicted) which is structured to couple with a corresponding joint member of a hitch. In the illustrated embodiment tool joint member 202 and tool joint member 204 are bolted to respective tow coupling members 124. In other embodiments, different types of fasteners or fastening techniques, such as welding may be utilized. In certain embodiments, tool joint member 202 and tool joint member 204 and their respective coupling members 124 may be provided as different portions of an integrated or unitary structure.

In the embodiment illustrated in FIGS. 1-5, side frame members 123 are coupled with the surface conditioning fence 115, front frame member 126 and rear frame member 125 are coupled with the side frame members 123, tow coupling members 124 are coupled with the front frame member 126 and rear frame member 125, and support struts 135 are coupled with and extend between surface conditioning fence 115 and front frame member 126 or surface conditioning fence 115 and rear frame member 125. The coupling of the frame components may be accomplished in a number of manners including, for example, welding or brazing members to one another or to intermediate structures, with bolts, clamps screws or other mechanical fasteners, by crimping, interlock or press fitting, and by combinations of the foregoing and other coupling techniques. It shall be appreciated that in other embodiments, the frame 116 may comprise of a number of additional or alternative components arranged in a number of different configurations.

Surface conditioning fence 115 includes a plurality of lateral elongate undulating fencing members 101, 102, 103, 104, 105 and 106 extending in a major direction along the width (X-axis) of the drag tool 100, spaced apart from one another along the length (Y-axis) of the drag tool 100, and undulating or varying in height (Z-axis direction) along the major direction. The embodiment illustrated in FIGS. 1-5 includes six lateral elongate undulating fencing members 101, 102, 103, 104, 105 and 106. It shall nevertheless be appreciated that other embodiments may include a greater or lesser number of lateral elongate undulating fencing members. In the illustrated embodiment, lateral elongate undulating fencing members 101, 102, 103, 104, 105 and 106 are configured as rods which have a circular cross-sectional shape. In other embodiments rods including a square, rectangular or other polygonal shapes may be used.

Surface conditioning fence 115 also includes a rear elongate lateral member 107 extending in a major direction along the width (X-axis) of the drag tool 100 and spaced apart from one another along the length (Y-axis) of the drag tool. In the illustrated embodiment, rear elongate lateral member 107 comprises substantially straight rod segments are generally parallel to their respective segments of frame 116. In contrast to the lateral elongate undulating fencing members 101, 102, 103, 104, 105 and 106, rear elongate lateral member 107 has a generally straight and does not undulate or vary in height (Z-axis direction) along the major direction. In the illustrated embodiment, rear elongate lateral member 107 is configured as a rod which has a circular cross-sectional shape. In other embodiments, a rod including a square, rectangular or other polygonal shapes may be used. In the illustrated embodiment, rear elongate lateral member 107 is structured to have a larger diameter than and to extend higher in the Z-axis direction than the other upper extremities of surface conditioning fence 115, such as those of lateral elongate undulating fencing members 102, 104, and 106. For example, rear elongate lateral member 107 may have a diameter preferably selected to be ⅜ inch +/−20% and more preferably to be ⅜ inch +/−10%. Rear elongate lateral member 107 may be positioned such that its lower extremity is positioned above the bottom extremity of surface conditioning fence 115 preferably by a distance of ¼ inch +/−20% and more preferably to be ¼ inch +/−10%.

Surface conditioning fence 115 further includes a first plurality of medial elongate undulating fencing members 110 extending in a major direction along the length (Y-axis) of the drag tool 100, spaced apart from one another along the width (X-axis) of the drag tool and undulating or varying in height (Z-axis direction) along the major direction. Surface conditioning fence 115 also includes a second plurality of medial elongate undulating fencing members 112 extending in a major direction along the length (Y-axis) of the drag tool, undulating or varying in height (Z-axis direction) along the major direction, and spaced apart from one another and from the first plurality of medial elongate undulating fencing members along the width (X-axis) of the drag tool 100. In the illustrated embodiment, medial elongate undulating fencing members 110 and 112 are configured as rods which have a circular cross-sectional shape. In other embodiments rods including a square, rectangular or other polygonal shapes may be used.

In the embodiment illustrated in FIGS. 1-5, the first plurality of medial elongate undulating fencing members 110 is sized and arranged such that it spans across and contacts each of the six lateral elongate undulating fencing members 101, 102, 103, 104, 105 and 106, and the second plurality of medial elongate undulating fencing members 112 is sized and arranged such that it spans across and contacts four of the six lateral elongate undulating fencing members 101, 102, 103 and 104. The illustrated arrangement may be preferred for certain applications such as grooming of baseball infield playing surfaces as it has proved to produce surprising benefits in precision and fine-tuning ability of the resulting playing surface by changing the pitch of the drag tool 100 as is described below in connection with FIGS. 10-12. It shall nevertheless be appreciated that in other embodiments the first plurality of medial elongate undulating fencing members 110 may span across and contact a different number of the lateral elongate undulating fencing members, for example, fewer than six or, in embodiments with additional lateral elongate undulating fencing members, more than six. Furthermore, the second plurality of medial elongate undulating fencing members 12 may span across and contact a greater or lesser number of the lateral elongate undulating fencing members.

In the embodiment illustrated in FIGS. 1-5, the first plurality of medial elongate undulating fencing members 110 and the second plurality of medial elongate undulating fencing members 112 are arranged in an alternating sequence such that every other one of the medial elongate undulating fencing members is either one of the first plurality of medial elongate undulating fencing members 110 or the second plurality of medial elongate undulating fencing members 112. It shall nevertheless be appreciated that in other embodiments, the first plurality of medial elongate undulating fencing members 110 and the second plurality of medial elongate undulating fencing members 112 are arranged in other sequences and patterns.

In the embodiment illustrated in FIGS. 1-5, the first plurality of medial elongate undulating fencing members 110 and the second plurality of medial elongate undulating fencing members 112 are arranged such that they are woven through respective ones of the lateral elongate undulating fencing members 101, 102, 103, 104, 105 and 106. As shown most clearly in the enlarged view of FIG. 2, a preferred form of the weaving pattern may have the characteristics summarized in Table 1 below where the following nomenclature is used: L/M indicates that the indicated lateral member is woven on top of (i.e., upward in the Z-axis direction) the indicated medial member, M/L is woven on top of (i.e., upward in the Z-axis direction) the indicated lateral member, CI indicates the relationship between rear elongate lateral member 107 and the medial members described above, and * denotes a relationship not visible in the view of FIG. 2.

TABLE 1

| | Lateral | | | | | | |
| --- | --- | --- | --- | --- | --- | --- | --- |
| Medial | 101 | 102 | 103 | 104 | 105 | 106 | 107 |
| 110a | M/L* | L/M | M/L | L/M | M/L | L/M | CI |
| 112a | L/M* | M/L | L/M | M/L | L/M | M/L | CI |
| 110b | M/L* | L/M | M/L | L/M | M/L | L/M | CI |
| 112b | L/M* | M/L | L/M | M/L | L/M | M/L | CI |
| 110c | M/L* | L/M | M/L | L/M | M/L | L/M | CI |
| 112c | L/M* | M/L | L/M | M/L | L/M | M/L | CI |
| 110d | M/L* | L/M | M/L | L/M | M/L | L/M | CI |
| 112d | L/M* | M/L | L/M | M/L | L/M | M/L | CI |

Surface conditioning fence 115 is one example of a fence comprising a plurality of elongate undulating fencing members which are oriented such that their height undulates in the Z-axis direction. In the example illustrated in FIGS. 1-5, a plurality of elongate undulating fencing members are oriented such that their height undulates in the Z-axis direction. In the embodiment illustrated in FIGS. 1-5, a first set of the lateral elongate undulating fencing members (e.g., lateral elongate undulating fencing members 101, 103 and 105) includes a first plurality of alternating peaks and valleys with the first plurality of peaks located at a first set of positions along the X-axis direction. A second set of the plurality of elongate undulating fencing members (e.g., lateral elongate undulating fencing members 102, 104 and 106) includes a second plurality of alternating peaks and valleys with the second plurality of peaks located at a second set of positions along the X-axis direction, the first set of positions being offset from the second set of positions in the X-axis direction.

In the embodiment illustrated in FIGS. 1-5, a similar relationship exists with respect to the plurality of medial elongate undulating fencing members. A first set of the plurality of medial elongate undulating fencing members (e.g., medial elongate undulating fencing members 110a, 110b, 110c and 110d) includes a first plurality of alternating peaks and valleys with the first plurality of peaks located at a first set of positions along the Y-axis direction. A second set of the plurality of medial elongate undulating fencing members (e.g., medial elongate undulating fencing members 112a, 112b, 112c and 112d in the medial direction) includes a second plurality of alternating peaks and valleys with the second plurality of peaks located at a second set of positions along the Y-axis direction, the first set of positions being offset from the second set of positions in the Y-axis direction.

Figure 6:
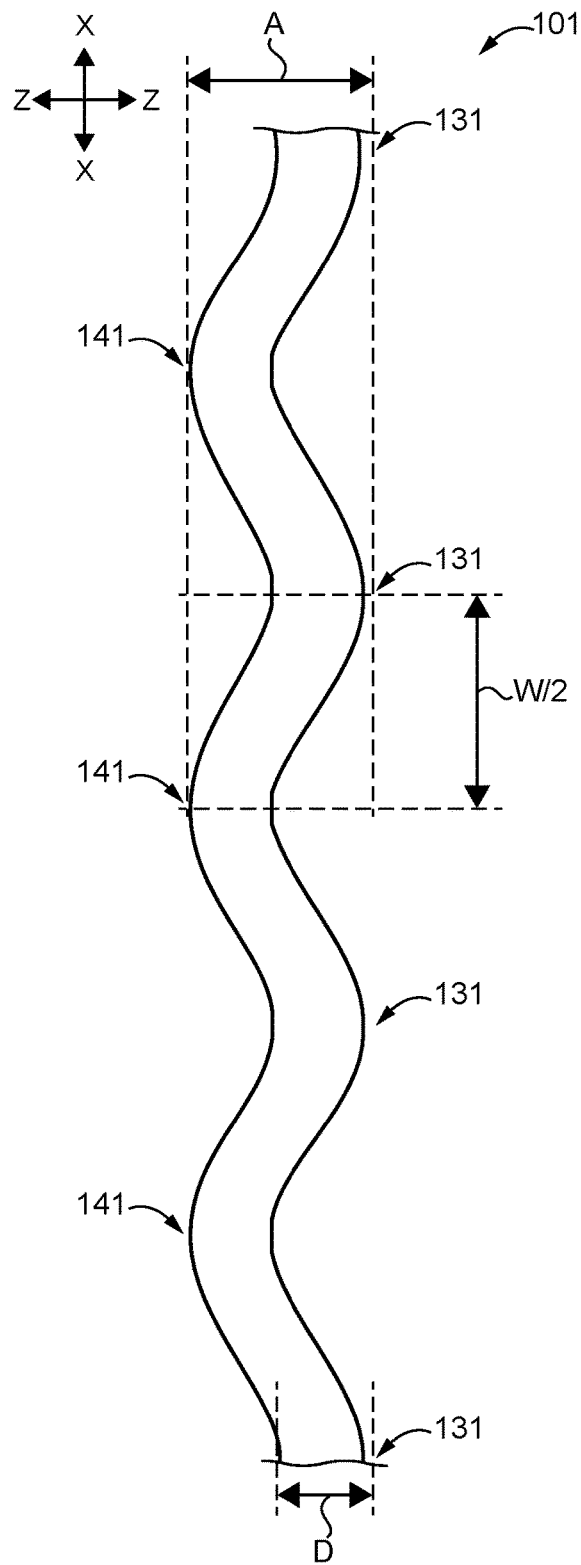
FIG. 6 is a side view of a portion of a lateral elongate undulating fencing member of the exemplary surface conditioning drag tool of FIG. 1.
Figure 7:
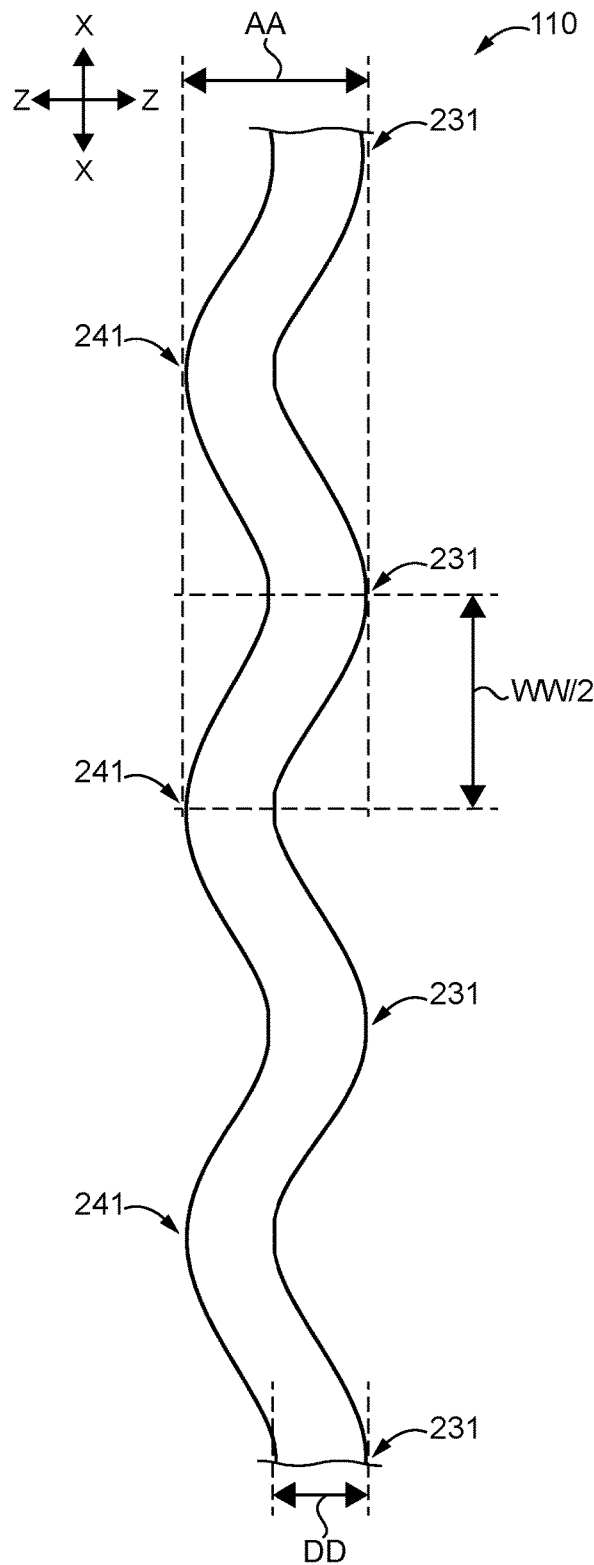
FIG. 7 is a side view of a portion of a medial elongate undulating fencing member of the exemplary surface conditioning drag tool of FIG. 1.

With reference to FIGS. 6 and 7, there are illustrated, respectively, a portion of an exemplary lateral elongate undulating fencing member 101 which may be referred to herein as fencing member portion 101a and a portion of an exemplary medial elongate undulating fencing member 110 which may be referred to herein as fencing member portion 110a. Surprisingly, it has been determined that preferred values for several dimensional aspects of a lateral elongate undulating fencing member and/or a medial elongate undulating fencing member can provide unexpected benefits when applied to surface conditioning drag tools such as surface conditioning drag tool 100 in the context of grooming an underlying ground surface such as a baseball diamond infield and warning track surfaces or other athletic field surfaces. These unanticipated benefits include mitigation of uneven deposition or deposits of conditioner or other ground surface material cause by operation of surface conditioning tools, reduction in the number of passes required to achieve uniform surface conditioning, reduction in the presence of visual markings on the ground surface caused by operation of surface conditioning tools, increased efficacy maintaining and avoiding disruption of an underlying subsurface base layer of the ground surface and concurrently uniformly lofting and loosening an upper layer or layers of material of the underlying ground surface.

In a one aspect, the amplitude A of fencing member portion 101a (e.g., a Z-axis distance between the alternating peaks 131 and valleys 141 of fencing member portion 101a) is preferably selected to be ½ inch +/−20% and more preferably to be ½ inch +/−10%. Similarly, the amplitude AA of fencing member portion 110a (e.g., a Z-axis distance between the alternating peaks 231 and valleys 241 of fencing member portion 110a) is preferably selected to be ½ inch +/−20% and more preferably to be ½ inch +/−10%. In another aspect, the half-wavelength W/2 of fencing member portion 101a (e.g., the X-axis distance between the alternating peaks 131 and valleys 141 of fencing member portion 101a) is preferably selected to be ⅝ inch +/−20% and more preferably to be ⅝ inch +/−10%. Similarly, the half-wavelength WW/2 of fencing member portion 110a (e.g., the X-axis distance between the alternating peaks 231 and valleys 241 of fencing member portion 110a) is preferably selected to be ⅝ inch +/−20% and more preferably to be ⅝ inch +/−10%. In a further aspect, the diameter D of fencing member portion 101a is preferably selected to be ¼ inch +/−20% and more preferably to be ¼ inch +/−10%. Similarly, the diameter D of fencing member portion 110a is preferably selected to be ¼ inch +/−20% and more preferably to be ¼ inch +/−10%. The preferred dimensions provide a sufficient of pointedness of the alternating peaks 131 and 231 and valleys 141 and 241 so as to provide effective loosening and restoration of top dressing or surface conditioner utilized in some applications such as baseball infields. The preferred dimensions also provide an optimized density of the fencing such that the ground contacting points are not so far apart as to provide inadequate loosening and movement or transportation of ground material and not too close together so as to provide too great a degree of loosening and movement or transportation of ground material.

It shall be appreciated that each of lateral elongate undulating fencing members 101, 102, 103, 104, 105 and 106 may be configured to have the characteristics of fencing member portion 101a along a portion or all of their length although, and may also be configured to have other dimensions in other embodiments. It shall also be appreciated that each of medial elongate undulating fencing members 110 and 112 may be configured to have the characteristics of fencing member portion 110a along a portion or all of their length although, and may also be configured to have other dimensions in other embodiments.

Figure 8:
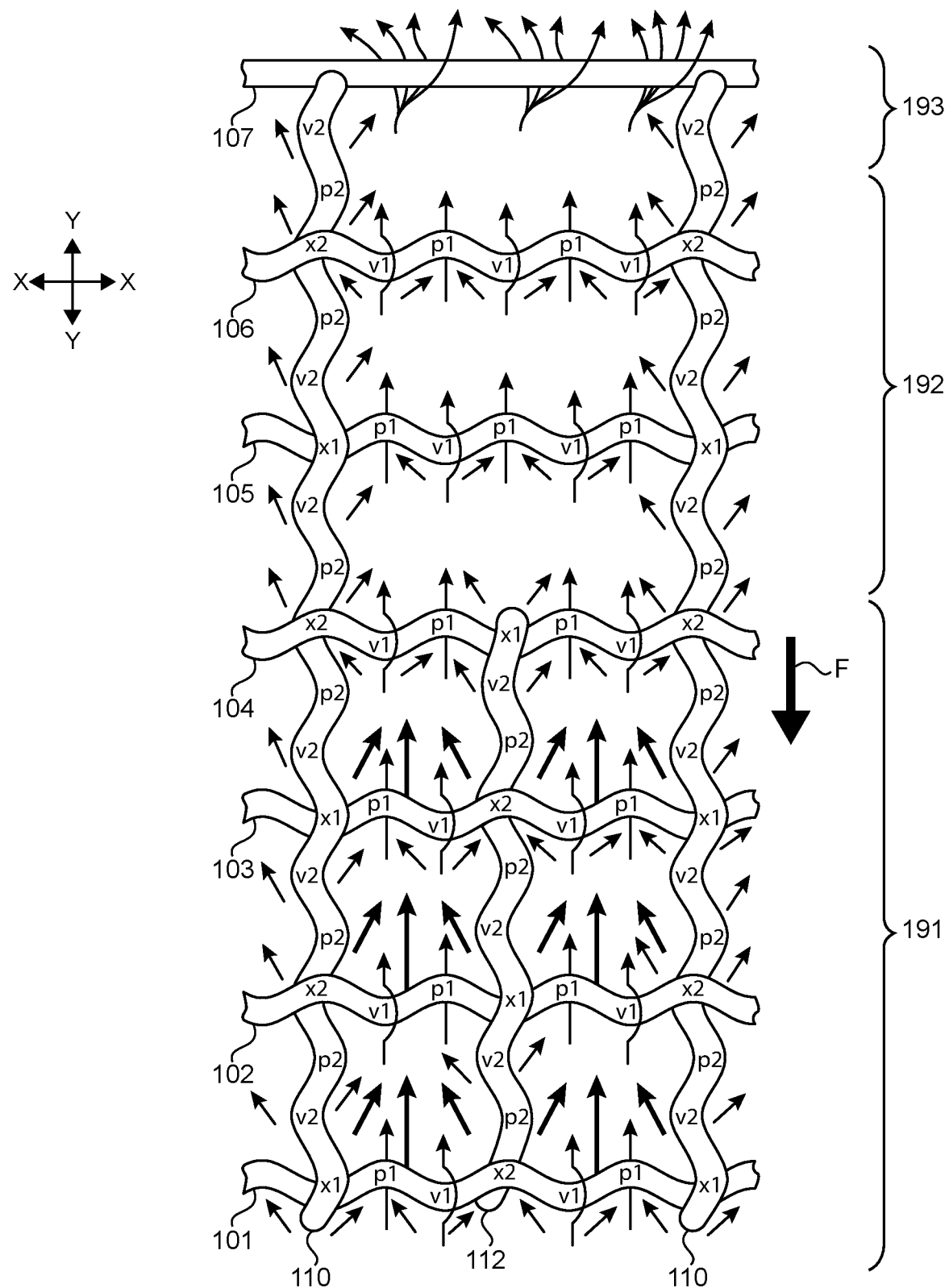
FIG. 8 is a partially diagrammatic view depicting an interaction of the exemplary surface conditioning drag tool of FIG. 1 with an underlying ground surface.

With reference to FIG. 8, there is illustrated a partially schematic depiction of the operation of exemplary surface conditioning drag tool 100. For clarity of illustration, only certain portions of lateral members 101-107 of drag tool 100 are depicted in the view of FIG. 8. Additionally, the literal orientation of lateral members 101-107 has been modified somewhat relative to their actual physical orientation to better illustrate certain features of drag tool 100. Furthermore, the surface conditioning drag tool 100 is illustrated as operating at a certain Z-axis depth relative to an underlying ground surface providing certain ground surface working characteristics.

As exemplary surface conditioning drag tool 100 is advanced in a forward direction indicated by arrow F, the underlying ground surface encounters a sequence of regions 191, 192 and 193 of surface conditioning drag tool 100 which provide differing surface conditioning characteristics. For example in region 191, the ground conditioning fence 115 comprises lateral elongate undulating fencing members 101-104 first medial elongate undulating fencing members 112 and second medial elongate undulating fencing members 112 which are arranged to provide the illustrated fencing patterns of regions 191 and 192.

In region 191, lateral elongate undulating fencing member 101 includes a sequence of peaks and valleys which includes a first type of peak p1 which are spaced apart from medial elongate undulating fencing member 110 and 112. As denoted with the illustrated arrows, material of the underlying ground surface substantially or entirely passes under the first type of peaks p1 as surface conditioning drag tool 100 is advanced in a forward direction indicated by arrow F. At deeper operating depths a portion of the underlying ground surface can pass under the first type of peaks p1 while another portion passes over peaks p1 or is pushed forward to and ultimately to the side of peaks p1. The proportion of these two portions varies with the working depth of surface conditioning drag tool 100. It shall be understood that analogous variation relative to operating depth may also occur relative to the other fencing features described below.

The sequence of peaks and valleys further includes a first type of valley v1 which are spaced apart from medial elongate undulating fencing member 110 and 112. As denoted with the illustrated arrows, some material of the underlying ground surface substantially or entirely passes over the first type of valley v1 and some material of the underlying ground surface is substantially or entirely pushed forward and ultimately to the side of the first type of valley v1 as surface conditioning drag tool 100 is advanced in a forward direction indicated by arrow F.

The sequence of peaks and valleys of lateral elongate undulating fencing member 101 also includes a second of type of peak which intersect with corresponding valleys of medial elongate undulating fencing members 110 and 112 which intersection is denoted x1, and a second type of valley which intersects with corresponding peaks of medial elongate undulating fencing members 110 and 112 which intersection is denoted x2. As denoted with the illustrated arrows, material of the underlying ground surface is substantially or entirely pushed forward and ultimately to the side of the intersections x1 and x2 as surface conditioning drag tool 100 is advanced in a forward direction indicated by arrow F. At deeper operating depths, a portion of material of the underlying ground surface may pass over intersections x1 and x2.

Lateral elongate undulating fencing members 102, 103 and 104 also include a sequence of peaks and valleys which include a substantially similar sequence of the first type of peak p1, the first type of valley v1, the first type of lateral-medial intersection x1 and the second type of lateral-medial intersection x2. The sequence of these features in lateral elongate undulating fencing members 101 and 103 are generally aligned with one another such that peaks p1 of members 101 and 103 are generally in the same X-axis position, valleys v1 of members 101 and 103 are generally in the same X-axis position, intersections x1 of members 101 and 103 are generally in the same X-axis position and intersections x2 of members 101 and 103 are generally in the same X-axis position. The sequence of these features in lateral elongate undulating fencing members 102 and 104 are generally aligned with one another in a substantially similar manner, but are offset from the corresponding features of lateral elongate undulating fencing members 101 and 102. Thus, for example, peak p1 of member 101 is generally aligned with valley v1 of member 102 in the X-axis direction and is offset from peak p1 of member 102 in the X-axis direction. It shall be appreciated that the illustrated form of offset is but one example and that other embodiments contemplate different relative offsets between and among the peaks valleys of each of the lateral elongate undulating fencing members.

Medial elongate undulating fencing members 110 and 112 include a sequence of peaks p2 and valleys v2 which are similar to, but are in generally perpendicular orientation relative to, the peaks p1 and valleys v1 of the lateral elongate undulating fencing members. As denoted with the illustrated arrows, material of the underlying ground surface is substantially or entirely pushed forward and ultimately to the side of valleys v2 and substantially or entirely passes under peaks p2 as surface conditioning drag tool 100 is advanced in a forward direction indicated by arrow F. The sequence of these features in medial elongate undulating fencing members 110 are generally aligned with one another such that peaks p2 of members 110 are generally in the same Y-axis position, valleys v2 of members 110 are generally in the same Y-axis position, intersections x1 of members 110 are generally in the same Y-axis position and intersections x2 of members 110 are generally in the same Y-axis position. The sequence of these features in medial elongate undulating fencing members 112 are generally aligned with one another in a substantially similar manner, but are offset from the corresponding features of lateral elongate undulating fencing members 110. Thus, for example, peaks p2 of members 110 are generally aligned with valleys v2 of members 112 in the Y-axis direction and are offset from peaks p2 of members 112 in the Y-axis direction. It shall be appreciated that the illustrated form of offset is but one example and that other embodiments contemplate different relative offsets between and among the peaks valleys of each of the medial elongate undulating fencing members.

In region 192, lateral elongate undulating fencing members 105 and 106 include a sequence of peaks and valleys which varies relative to the sequence of members 101-104 due to the absence of medial elongate undulating fencing members 112, but is otherwise similar to the sequence of members 101-104. In particular, fewer intersections x1 and x2 are provided in region 192 as only medial elongate undulating fencing members 110 are available to form intersections. As a result, the forward and sideways pushing of material of underlying ground surface which is provided by intersections x1 and x2 are reduced and the instances where material simply passes over valleys v1 or under peaks p1 is increased.

The arrangement of lateral and medial elongate undulating fencing members in region 191 provides a first density of undulating peaks and valleys which correspondingly provides a first pattern of void regions. In the illustrated embodiment each of the first void regions is substantially square and sized to have an area of about 2.25 square inches. Other embodiments may have voids greater or lesser areas and lengths and widths providing other area shapes.

The arrangement of lateral and medial elongate undulating fencing members in region 192 provides a second density of undulating peaks and valleys which differ from the first density and which correspondingly provides a second pattern of void regions which differ from the first pattern of void regions. In the illustrated embodiment each of the second void regions is substantially rectangular and sized to have an area of about 4.5 square inches. Other embodiments may have voids greater or lesser areas and lengths and widths providing other area shapes. It shall be appreciated that region 192 the second, lesser density of undulating peaks and valleys purposefully allows more passage of surface material through fencing 115 than region 191.

In region 193, rear elongate lateral member 107 provides a final loft or feathering of ground surface material as indicated by the illustrated groups of arrows. This characteristic is attributable in part to the Z-axis offset of rear elongate lateral member 107 relative to the other fencing members which allows it to provide greater loft and feathering of loosened material that it encounters. The offset may be selected to account for the fact that a greater height of loosened material may be encountered by rear elongate lateral member 107 due to the prior loosening effect on the material of the ground surface achieved by the passage of regions 191 and 192 across the ground surface.

In FIG. 8, the surface conditioning drag tool 100 is positioned generally parallel to an underlying ground surface and at a Z-axis depth relative to the underlying ground surface such that at least a portion of the fencing members have penetrated into and are traveling through an upper layer of relatively loose ground surface material, such as a top dressing, and are traveling or riding over an upper surface of an underlying relatively compact ground surface. Several examples of surfaces which may be worked in this manner are illustrated and described in connection with FIGS. 13-15.

The state of adjustment illustrated in FIG. 8, provides surface working characteristics which are indicated by the illustrated plurality of arrows extending either toward, away from, under, or over the illustrated fencing members. Arrows extending over the illustrated fencing members indicate a sifting action in which tends to loft the ground material passing over the fencing. Arrows extending under the illustrated fencing members indicate a sifting action analogous to a raking action which tends to gather ground material together for passage under the fencing and may break up larger chunks or clusters of material. By providing an arrangement of peaks and valleys which are offset from one another in sequential ones of the lateral elongate undulating fencing members, a sequential and repeated lofting and raking of the underlying ground surface traversed by surface conditioning drag tool 100 can be achieved.

Arrows extending toward fencing members, for example, the arrows extending diagonally toward peaks p1 and intersections x1 of lateral undulating fencing member 101, indicate the loosening action which occurs when material of the underlying ground surface is engaged by and moved by surface conditioning drag tool 100. The force per ground contact point of the surface conditioning drag tool 100 and the geometry of its fencing may be selected such that this loosening action leaves the underlying relatively compact ground surface substantially intact (e.g., does not disrupt any previously established grade), but works to engage and separate material previously found in the upper layer of relatively loose ground surface material which has become compacted into the underlying relatively compact ground surface. For certain applications, such as grooming of baseball infield and warning track surfaces, the inventors have determined that a tool weight of about 40 pounds, a fencing pattern of the form illustrated and described in connection with FIGS. 1-5, and an overall tool dimension of about 6-7 feet in lateral width and about 10-14 inches in longitudinal length will provide surprisingly effective results over a wide range of playing surface compositions.

The force per ground contacting extremity may be determined from the ratio between the weight of a given tool and the number of ground contacting extremities. For example, a 40-pound tool with 400 ground contacting extremities would have a force of 0.1 pounds per ground contacting extremity. Similarly, a 40-pound tool with 800 ground contacting extremities would have a force of 0.05 pounds per ground contacting extremity. For certain applications a force per ground contacting extremity of about 0.1 pounds per ground contacting extremity +/−10% may be preferred. For certain applications a force per ground contacting extremity of about 0.1 pounds per ground contacting extremity +/−20% may be preferred. For certain applications, a force per ground contacting extremity between about 0.05 and 0.15 pounds per ground contacting extremity may be preferred. For certain applications, a force per ground contacting extremity less than or equal to 0.25 pounds per ground contacting extremity may be preferred. It shall be appreciated that ground contacting extremities generally refers to the locations (e.g., points or regions) of a given fencing pattern that extend downward to the greatest extent and that other parts of the fencing may also contact the underlying ground surface although they are not considered to be ground contacting extremities. In certain embodiments, for example, the valleys of a fencing member may define ground contacting extremities.

Arrows extending away from fencing members indicate a material carrying action in which surface conditioning drag tool 100 carries material of the underlying ground surface with it as it advances over an underlying ground surface. The carrying action of surface conditioning drag tool varies in different regions of the fencing. In the illustrated configuration, the carrying action is greatest in region 191 where the fencing pattern is most dense. The carrying action in region 192 is decreased due to the lower density of the fencing pattern in this region. The carrying action in region 193 is minimal to due to the minimal density of the fencing pattern.

The carrying action of surface conditioning drag tool also varies depending on the characteristics of the ground surface which is working. For example, when carried material encounters a divot or a void in underlying relatively compact ground surface, such as may be left by an athletic cleat, a portion of the material being carried forward will be deposited and left behind in the divot or void thereby contributing to the restoration of the underlying relatively compact ground surface. The carrying action of surface conditioning drag tool 100 will vary depending on its state of adjustment. For example, as further described in connection with FIG. 9 and FIGS. 10-12, pitch adjustment of surface conditioning drag tool 100 may vary the amount of carrying action provided by surface conditioning drag tool 100.

Figure 9:
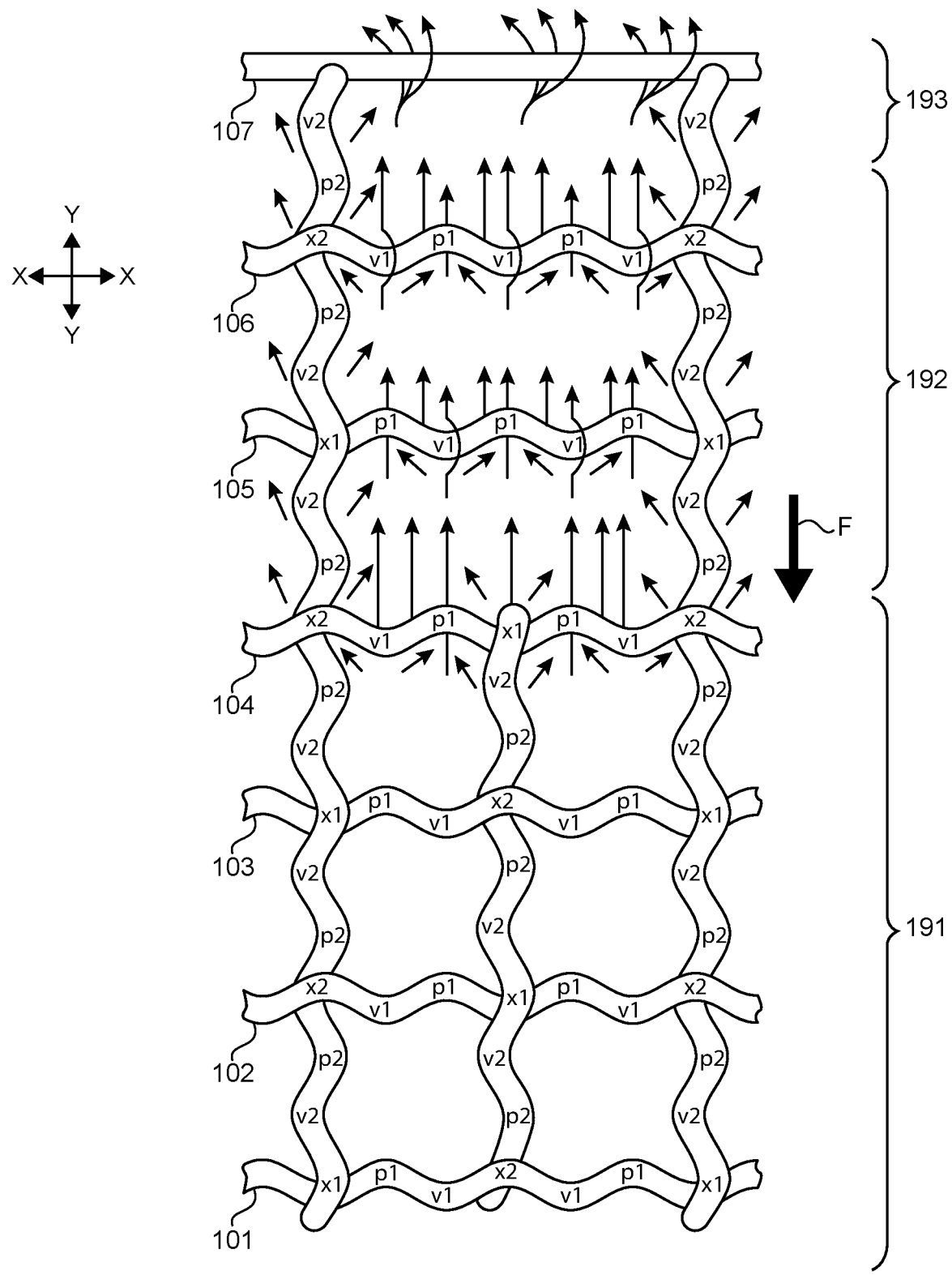
FIG. 9 is a partially diagrammatic view depicting another interaction of the exemplary surface conditioning drag tool of FIG. 1 with an underlying ground surface.

Referring now to FIG. 9, surface conditioning drag tool 100 is positioned at an angle relative to an underlying ground surface and the Z-axis depth of surface conditioning drag tool 100 relative to the underlying ground, therefore, varies in the Y-axis direction. In FIG. 9 the fencing in region 191 has been raised above the underlying ground surface and thereby taken out of play. The fencing in region 192 remains in play but is angled relative to the underlying ground surface. This angling causes different ones of the lateral elongate undulating fencing members to engage the underlying ground surface somewhat differently. For example, lateral elongate undulating fencing member 104 is positioned in and travels through an upper region of an upper layer of relatively loose ground surface material, such as a top dressing. As a result little to no material of the underlying ground surface travels over lateral elongate undulating fencing member 104. Additionally, the amount of lofting and raking and the amount of material carried forward by and the amount of material by the lateral elongate undulating fencing member 104 are decreased relative its performance in the configuration of FIG. 8.

Lateral elongate undulating fencing member 105 is positioned in and travels through a region of the upper layer of relatively loose ground surface material that is deeper than region worked by lateral elongate undulating fencing member 104 but is raised relative to the position of lateral elongate undulating fencing member 105 illustrated in FIG. 8. Accordingly, the amount of lofting and raking and the amount of material carried forward by and the amount of material by the lateral elongate undulating fencing member 105 is greater than what is provided by lateral elongate undulating fencing member 104 but decreased somewhat relative the performance of lateral elongate undulating fencing member 105 in the configuration of FIG. 8.

Lateral elongate undulating fencing member 106 is positioned in and travels through a lower region of the upper layer of relatively loose ground surface and travels or rides over an upper surface of the underlying relatively compact ground surface. The lofting, raking, carrying and loosening action of lateral elongate undulating fencing member 106 are greater than what is provided by lateral elongate undulating fencing member 105 and may be comparable to or greater than the performance of lateral elongate undulating fencing member 106 in the configuration of FIG. 8.

Figure 10:
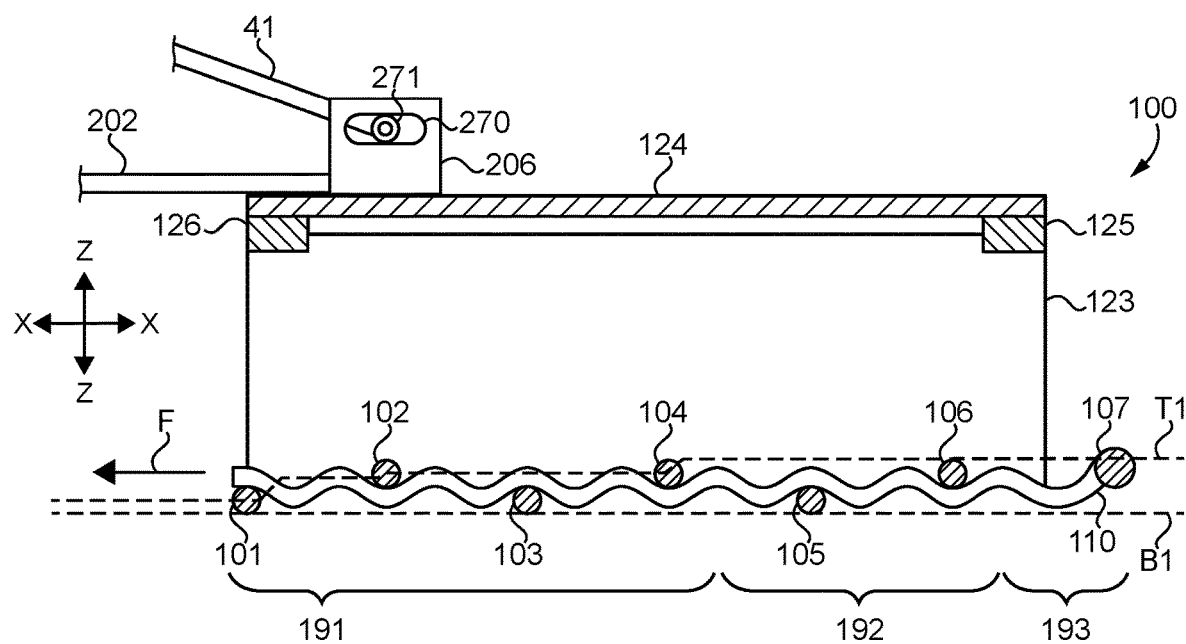
FIG. 10 is a side view of an exemplary surface conditioning drag in a first orientation relative to an underlying playing surface.
Figure 11:
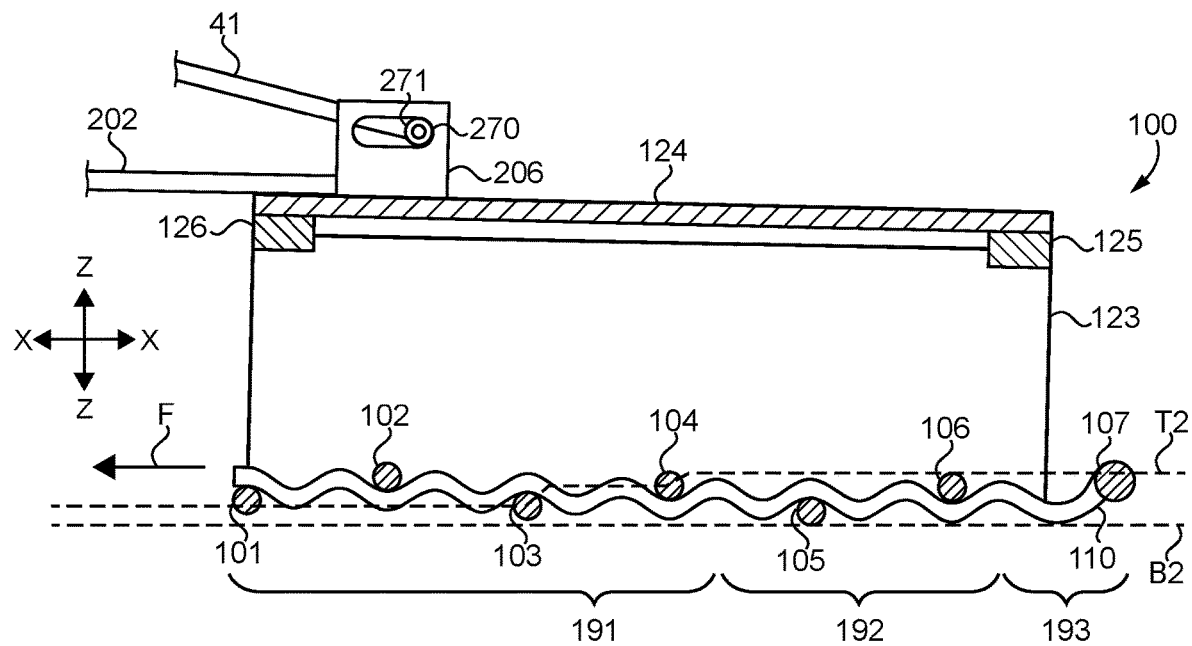
FIG. 11 is a side view of an exemplary surface conditioning drag in a second orientation relative to an underlying playing surface.
Figure 12:
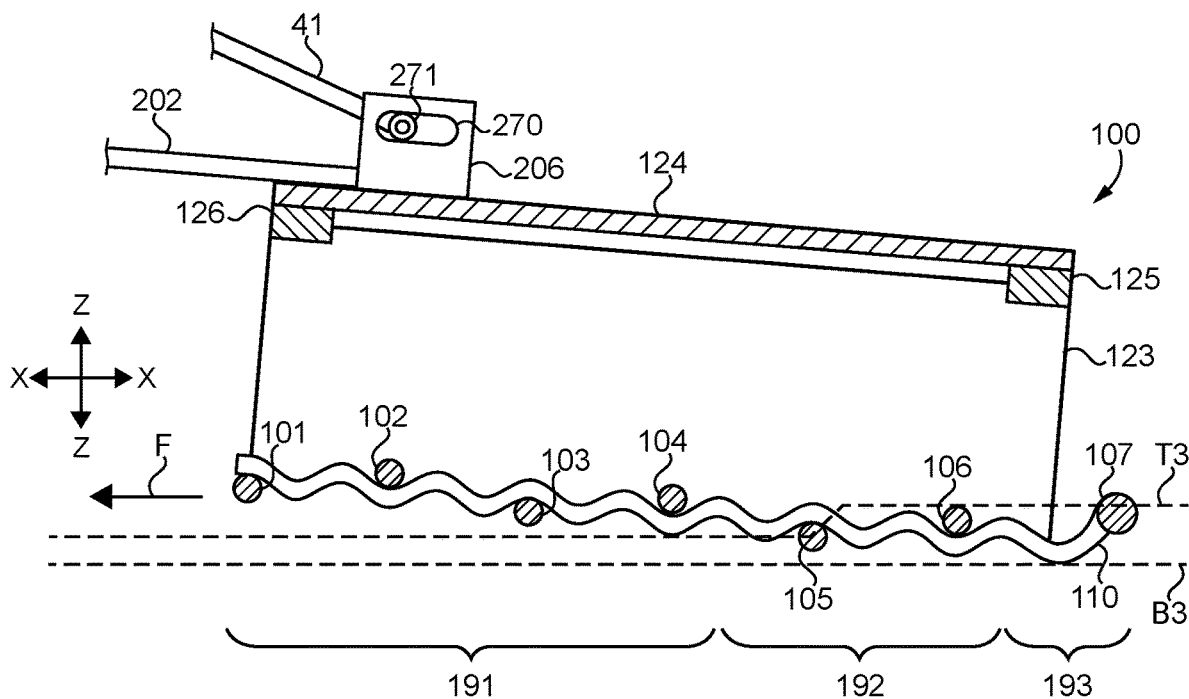
FIG. 12 is a side view of an exemplary surface conditioning drag in a third orientation relative to an underlying playing surface.

With reference to FIGS. 10-12, three are illustrated partially diagrammatic side views of several operating states of a surface conditioning drag tool 100. In FIG. 10 surface conditioning drag tool 100 is substantially parallel to the underlying ground surface which includes a base layer B1 and a top surface T1. In FIG. 11 surface conditioning drag tool 100 is rotated clockwise relative to the view of FIG. 10, such that it is an at first angle relative to the underlying ground surface which includes a base layer B2 and a top surface T2. In FIG. 12 surface conditioning drag tool 100 is further rotated clockwise relative to the view of FIG. 11 such that it is an at a second angle greater than the first angle relative to the underlying ground surface which includes a base layer B3 and a top surface T3.

In the orientation of FIG. 10, as surface conditioning drag tool 100 advances forward in the direction generally indicated by arrow F, the top surface T1 of the underlying ground surface is loosened and consequently increases in vertical depth as it encounters each of lateral undulating fencing members 101, 102, 103 and 104 in region 191, lateral undulating fencing members 105 and 106 in region 192, and rear elongate lateral member 107 in region 193 as well as the intermediate portions of medial undulating fencing members 110 and 112. Concurrently, the base layer B1 of the underlying ground surface is compacted and increased in uniformity as it encounters each of lateral undulating fencing members 101, 102, 103 and 104 in region 191, and lateral undulating fencing members 105 and 106 in region 192 as well as, to a degree, the intermediate portions of medial undulating fencing members 110 and 112.

In the orientation of FIG. 11, lateral undulating fencing members 101 and 102 are taken substantially out of play. Thus, as conditioning drag tool 100 advances forward in the direction generally indicated by arrow F, the top surface T1 of the underlying ground surface is loosened and consequently increases in vertical depth as it encounters each of lateral undulating fencing members 103 and 104 in region 191, lateral undulating fencing members 105 and 106 in region 192, and rear elongate lateral member 107 in region 193 as well as the intermediate portions of medial undulating fencing members 110 and 112. Concurrently, the base layer B1 of the underlying ground surface is compacted and increased in uniformity as it encounters each of lateral undulating fencing members 103 and 104 in region 191, and lateral undulating fencing members 105 and 106 in region 192 as well as, to a degree, the intermediate portions of medial undulating fencing members 110 and 112. Accordingly, it can be seen that the degree to which region 191 participates in surface conditioning, and resulting loosening and forward carrying of ground surface material can be varied by operating surface conditioning drag tool 100 at different angular orientations.

In the orientation of FIG. 12, lateral undulating fencing members 101, 102, 103 and 104 are taken substantially out of play. Thus, as conditioning drag tool 100 advances forward in the direction generally indicated by arrow F, the top surface T1 of the underlying ground surface is loosened and consequently increases in vertical depth as it encounters lateral undulating fencing members 105 and 106 in region 192, and rear elongate lateral member 107 in region 193 as well as the intermediate portions of medial undulating fencing members 110 and 112. Concurrently, the base layer B1 of the underlying ground surface is compacted and increased in uniformity as it encounters each of lateral undulating fencing members 105 and 106 in region 192 as well as, to a degree, the intermediate portions of medial undulating fencing members 110 and 112. Accordingly, it can be seen that the region 191 be taken entirely out of play so that it does not participate in surface conditioning, and resulting forward movement of ground surface material can be varied by operating surface conditioning drag tool 100 at different angular orientations. It shall be appreciated that over a range of angular positioning the degree to which region 192 participates in surface conditioning, and the resulting loosening and forward carrying of ground surface material can be varied by operating surface conditioning drag tool 100 at different angular orientations.

FIGS. 10-12 further illustrates tool joint members which are operable to couple surface conditioning tool 100 with a hitch that may, in turn, be coupled with a work machine. Tool joint member 202 is coupled with and extends forward from one of tow coupling members 124 and includes a joint member at its forward end (not depicted). Tool joint member 204 (not visible in the side views of FIGS. 10-12) is coupled with and extends forward from the other of tow coupling members 124 and includes a joint member at its forward end (not depicted). Tool joint member 206 is coupled with and extends upward from surface conditioning tool 100 at a central location intermediate tow coupling members 124. Tool joint member 206 includes a slot 270 which is coupled with a top link 41 by a pin 271.

In the state of adjustment of FIG. 10, pin 271 is located at a central portion of slot 270 and surface conditioning drag tool 100 is substantially parallel to the underlying ground surface. In the state of adjustment of FIG. 11, pin 271 is located at a forward end portion of slot 270 and surface conditioning drag tool 100 is angled upward relative to the underlying ground surface. In the state of adjustment of FIG. 12, pin 271 is located at a forward end portion of slot 270 and surface conditioning drag tool 100 is angled upward relative to the underlying ground surface to a greater degree than the configuration of FIG. 11. These configurations illustrate that a degree of pitch adjustability may be accommodated by the adjustment of pin 271 within slot 270.

It shall be appreciated that the different states of adjustment of FIGS. 10-12 provide different degrees of conditioning or working of an underlying ground surface. The state of adjustment of FIG. 10 may be considered a heavy drag or high degree of conditioning as all of surface conditioning drag tool 100 is in play and is working the underlying ground surface. The state of adjustment of FIG. 11 may be considered a medium drag or middle degree of conditioning as a portion of surface conditioning drag tool 100 has been removed from play and no longer participates in working the underlying ground surface. The state of adjustment of FIG. 12 may be considered a light drag or low degree of conditioning as an even greater portion of surface conditioning drag tool 100 has been removed from play and no longer participates in working the underlying ground surface. A progression from the states of adjustment illustrated in FIGS. 10-12 may be utilized to provide so-called "drive-off" grooming of certain ground surfaces by tapering down the surface material carrying volume of the work tool thereby allowing a controlled release of all material carried by the tool while mitigating or eliminating uneven deposition of surface material. For example, by transitioning from the state of adjustment illustrated in FIG. 12 to the state of adjustment illustrated in FIG. 13, a tapering down of the release of ground material to a minimal final release of ground material can be accomplished substantially mitigating any surface irregularities on the underlying ground surface.

Figure 13:
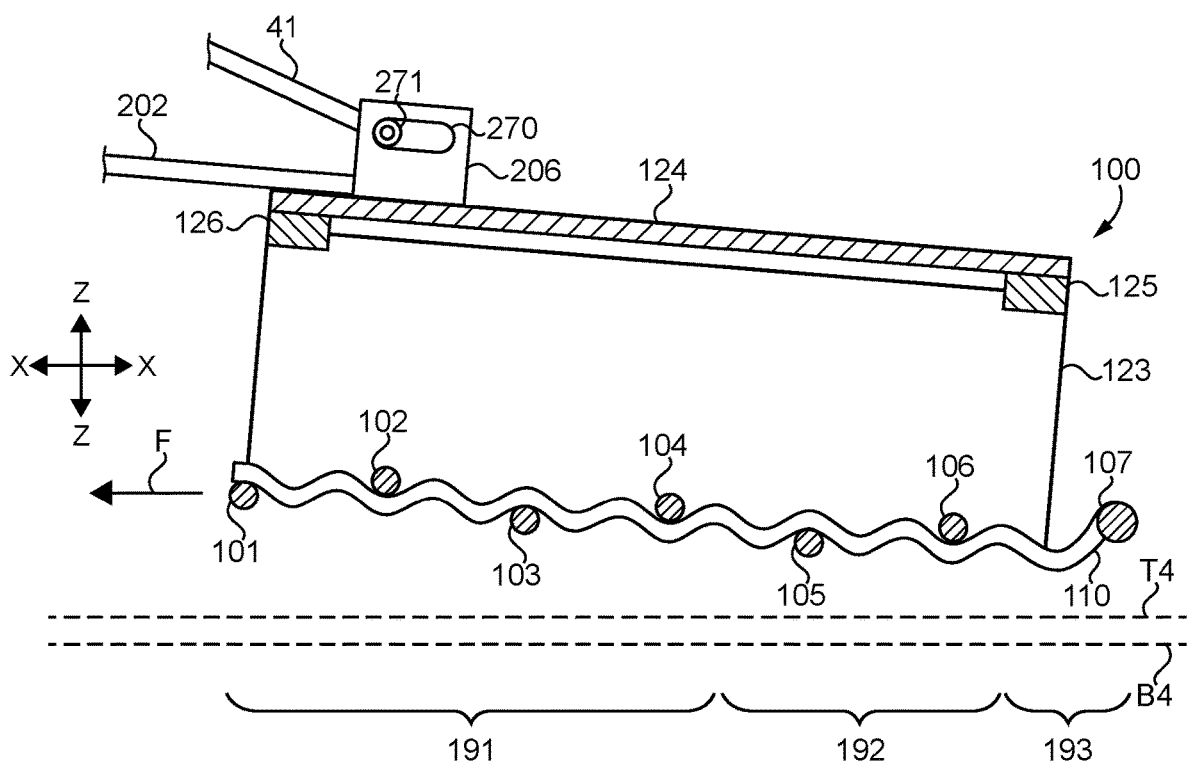
FIG. 13 is a side view of an exemplary surface conditioning drag in a fourth orientation relative to an underlying playing surface.
Figure 14:
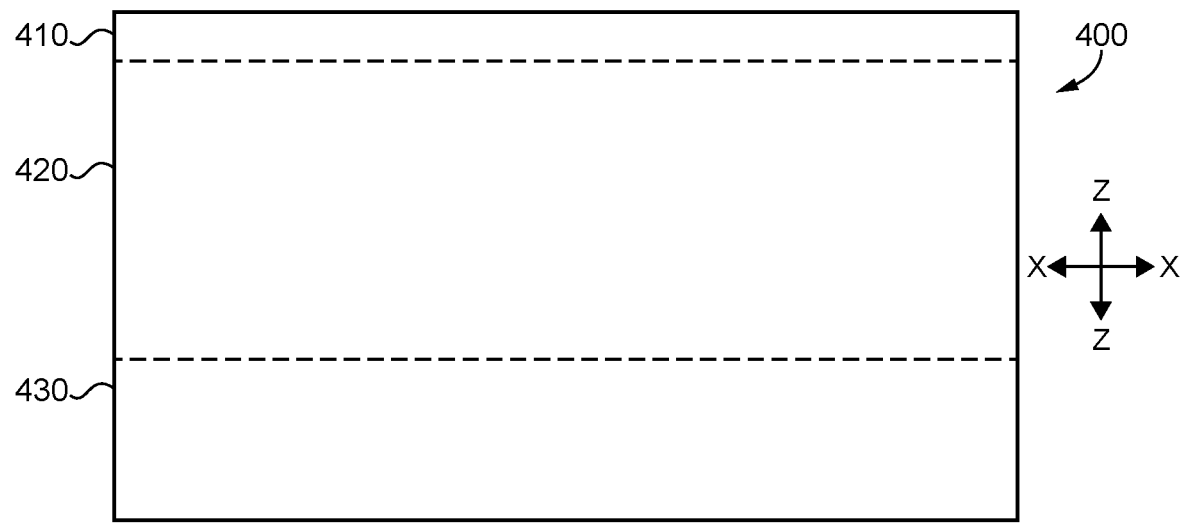
FIGS. 14 and 15 are side sectional schematic views of two exemplary ground surfaces which may be worked by the surface conditioning drag tools disclosed herein.
Figure 15:
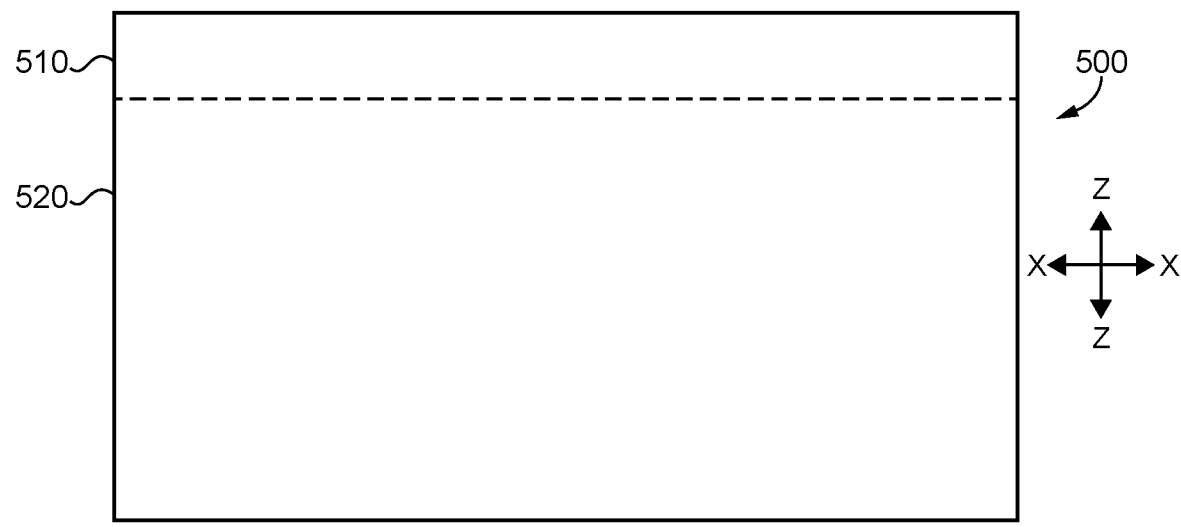

With reference to FIGS. 13-15 there are illustrated side sectional schematic views of exemplary ground surfaces 300, 400, and 500, respectively, which may be worked by the surface conditioning drag tools disclosed herein. Ground surface 300 is an example of a more highly engineered ground surface and includes a top dressing layer 310 disposed on an infield mixture layer 320 which is, in turn, disposed on base layer 330. Top dressing layer 310 may have a thickness of about ¼ inch ½ inch, although other thicknesses are possible, and may be of a composition described above. Top dressing layer 310 is an example of an upper layer of relatively loose ground surface material. Infield mixture layer 320 has material with a composition designed to provide a high degree of drainage. Infield mixture layer 320 may have a thickness of about 3 inches to 6 inches and has been compacted to some degree and graded to provide desirable drainage characteristics. Base layer 330 may be a native soil material or may be a layer of roller packed crushed stone. Regardless of its composition, the base layer is preferably compacted to some degree and graded to provide desirable drainage characteristics.

Ground surface 400 is an example of another engineered ground surface and includes a top dressing layer 410 disposed on an infield mixture cap layer 420 which is disposed on an augmented layer 425 which is, in turn, disposed on base layer 430. Top dressing layer 410 may have a thickness of about ¼ inch ½ inch, although other thicknesses are possible, and may be of a composition described above. Top dressing layer 410 is an example of an upper layer of relatively loose ground surface material. Cap layer 420 has material with a composition designed to provide a high degree of drainage such as an infield mixture. Cap layer 420 may have a thickness of about 1 inch to 2 inches and has been compacted and graded to provide desirable drainage characteristics. Augmented layer 425 comprises a mixture of native soil material and an augmenting additive (e.g., clay augmented into sandy soil or sandy soil augmented into clay). Play mixture cap layer 420 may have a thickness of about 2 inches or more and may or may not have been compacted to a limited degree and graded to provide desirable drainage characteristics. Base layer 430 is a native soil material and has typically been minimally or not at all compacted or graded.

Ground surface 500 is an example of a less engineered ground surface and includes a top dressing layer 510 disposed on a base layer 530. Top dressing layer 310 may have a thickness of about ¼ inch ½ inch, although other thicknesses are possible, and may be of a composition described above, typically one of the less highly engineered and therefore less costly top dressing materials, for example, high sand content soil. Top dressing layer 310 is an example of an upper layer of relatively loose ground surface material. Base layer 330 is a native soil material and has been compacted to a limited degree and graded to provide desirable drainage characteristics.

It shall be appreciated that exemplary ground surfaces 300, 400, and 500 represent certain examples of a variety of types of ground surfaces that may benefit from the surface conditioning drag tools disclosed herein. A variety of other ground surfaces may also benefit from the surface conditioning drag tools disclosed herein. For example, the top dressing may be provided by augmenting native surface material or, a top dressing material may be provided by working native surface material without augmentation, such as by grooming a native soil deemed to have an acceptably sandy composition for play. The thicknesses of the top dressing layer and underlying layers vary significantly, for example, among in equine arena facilities, baseball infields, landscaping applications and other types of athletic fields. Thus, while certain aspects of the present disclosure offer unique benefits in certain contexts, they are not necessarily limited to any particular application or type of ground surface.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A drag tool having a width, a length and a height respectively extending in an X-axis direction, a Y-axis direction and a Z-axis direction of an X-Y-Z coordinate system, the drag tool comprising:
    a ground working fence including a first plurality of elongate undulating fencing members extending along the width of the drag tool and spaced apart from one another along the length of the drag tool and a second plurality of elongate undulating fencing members extending along the length of the drag tool and spaced apart from one another along the width of the drag tool, the first plurality of elongate undulating fencing members and the second plurality of elongate undulating fencing members defining a plurality of openings of the ground working fence; and
    a frame coupled with the ground working fence by a plurality of support struts extending in the Z-axis direction over a space between the frame and the ground working fence;
    wherein the first plurality of elongate undulating fencing members are oriented such that their height undulates in the Z-axis direction, a first set of the first plurality of elongate undulating fencing members includes a first plurality of alternating peaks and valleys with a first plurality of peaks located at a first set of positions along the X-axis direction, and a second set of the first plurality of elongate undulating fencing members includes a second plurality of alternating peaks and valleys with a second plurality of peaks located at a second set of positions along the X-axis direction, the first set of positions being offset from the second set of positions in the X-axis direction, and wherein the space between the frame and the ground working fence extends in the Y-axis direction from a leading open end of the drag tool to a trailing open end of the drag tool permitting passage of material in the Y-axis direction from the leading open end to the trailing open end, a first set of the plurality of openings have respective first areas, and a second set of the plurality of openings have respective second areas greater than the first areas, the first set of the plurality of openings being positioned between the leading open end and the second set of the plurality of openings, and the second set of the plurality of openings being positioned between the the first set of the plurality of openings and the trailing open end.

2. The drag tool of claim 1 wherein the first areas extend over respective first lengths in the Y-axis direction, the second areas extend over respective second lengths in the Y-axis direction, and the second lengths are greater than the first lengths.

3. The drag tool of claim 1 wherein a first set of the second plurality of elongate undulating fencing members extends a first distance along the length of the drag tool and a second set of the second plurality of elongate undulating fencing members extends a second distance along the length of the drag tool, the first distance being greater than the second distance.

4. The drag tool of claim 3 wherein the second plurality of elongate undulating fencing members are oriented such that their height undulates in the Z-axis direction.

5. The drag tool of claim 1 wherein a ratio of weight of the drag tool to number of valleys is 0.1 pounds per valley +/−10%.

6. The drag tool of claim 1 wherein the plurality of elongate undulating fencing members comprise a diameter of ¼ inch +/−10%, a Z-axis distance between alternating peaks and valleys of ½ inch +/−20%, and a X-axis distance between alternating peaks and valleys of ⅝ inch +/−20%.

7. The drag tool of claim 1 wherein the second set of the plurality of elongate undulating fencing members comprise a diameter of ¼ inch +/−20%, a Z-axis distance between alternating peaks and valleys of ½ inch +/−20%, and a X-axis distance between alternating peaks and valleys of ⅝ inch +/−20%.

* * * * *